United States Patent [19]

Kimura et al.

[11] Patent Number: 4,926,404
[45] Date of Patent: May 15, 1990

[54] DISK PLAYING METHOD FOR DISK PLAYER

[75] Inventors: Toshiyuki Kimura; Yoshio Aoyagi; Fumio Endo, all of Saitama, Japan

[73] Assignee: Pioneer Electronic Corporation, Tokyo, Japan

[21] Appl. No.: 406,498

[22] Filed: Sep. 13, 1989

Related U.S. Application Data

[62] Division of Ser. No. 253,472, Oct. 5, 1988, Pat. No. 4,882,719, which is a division of Ser. No. 164,353, Mar. 4, 1988, Pat. No. 4,855,979.

[30] Foreign Application Priority Data

| Mar. 4, 1987 | [JP] | Japan | 62-47790 |
| Mar. 4, 1987 | [JP] | Japan | 62-42291 |
| Mar. 4, 1987 | [JP] | Japan | 62-47793 |
| Mar. 4, 1987 | [JP] | Japan | 62-47794 |

[51] Int. Cl.⁵ .................... G11B 27/10; G11B 21/10
[52] U.S. Cl. .................... 369/32; 360/78.07; 369/33; 369/47; 369/124
[58] Field of Search ............ 369/32, 33, 34, 36, 369/38, 100, 124, 47; 360/78.04, 78.07, 78.08

[56] References Cited

U.S. PATENT DOCUMENTS

| 4,587,643 | 5/1986 | Monen et al. | 369/32 |
| 4,615,023 | 9/1986 | Inada et al. | 369/32 |
| 4,719,610 | 1/1988 | Bates | 369/32 |
| 4,723,235 | 2/1988 | Yasuda et al. | 369/32 |
| 4,740,938 | 4/1988 | Bierhoff et al. | 369/32 |
| 4,752,920 | 6/1988 | d'Alayarde | 369/33 |
| 4,855,979 | 8/1989 | Kimura et al. | 369/33 |
| 4,882,719 | 11/1989 | Kimura et al. | 369/32 |

Primary Examiner—Steven L. Stephan
Attorney, Agent, or Firm—Sughrue, Mion, Zinn, MacPeak & Seas

[57] ABSTRACT

A disk playing method for a compact disk player or the like in which the time before the start of the playback of designated portion of the disk is reduced. An accumulated total time code is read in the led-in area of the disk, and a predetermined code is detected during this reading operation. If though the predetermined code cannot be detected in reading the accumulated total time code, a frame calculation is carried out to jump the pickup of the disk player across tracks to read another accumulated total time code, whereupon, after the predetermined code has been read, necessary data is read from the lead-in region.

1 Claim, 5 Drawing Sheets

DISK PLAYING METHOD FOR DISK PLAYER

This is a divisional of Application No. 07/253,472 filed Oct. 5, 1988, now U.S. Pat. No. 4,882,719, which is a Divisional Application of 07/164,353 filed Mar. 4, 1988, now U.S. Pat. No. 4,855,979.

BACKGROUND OF THE INVENTION

The present invention relates to a lead-in reading system for a disk player in which, in reading an accumulated total time code (TOC) recorded in the lead-in region of the disk in the playback of the disk, the top portion of the TOC is detected.

In an optical disk such as a compact disk, the above-described TOC is recorded in the lead-in region of the disk which is firstly read with the pickup. The TOC includes data representing the total number of pieces of music recorded in the disk, the reproduction time (hours and minutes) of all the pieces of music, and the address and reproduction time of each of the pieces of music.

In general, these data should be read in the order of the total number of pieces of music, the reproduction time of all the pieces of music, and the address of each of the pieces of music.

For this purpose, heretofore in the case where the TOC in the lead-in region of the disk is read with the pickup, the data read are abandoned until the total number of pieces of music is read. That is, the time which has elapsed until the total number of pieces of music is read is wasted, and accordingly, it takes a relatively long period of time to read all the aforementioned data. Hence, the playback of the disk cannot be started quickly.

Further, the invention relates to a random music selection system for a disk player in which, when an operator specifies random music selection, the same piece of music is not mixed in a predetermined number of pieces of music to be reproduced.

In conventional playback method for an optical disk such as a compact disk, when the operator specifies random music reproduction, random numbers are generated in a processor and pieces of music are selected at random and played in the order thus selected. However, the conventional method is disadvantageous in that the same piece of music may be reproduced successively or reproduced again after several pieces of music successively or reproduced again after several pieces of music.

Still further, the invention relates to a music selection method for a disk player in which, in the playback of a disk, when the operator selects a piece of music, a search is made for the selected piece of music according to the total reproduction time and total number of pieces of music as read from the accumulated total time code recorded in the lead-in area of the disk.

Heretofore, when, in the playback of an optical disk such as a compact disk, the operator selects a piece of music, a search is made for the piece of music according to its address (or music number) read from an accumulated total time code recorded in the lead-in region of the disk.

The TOC includes the total number of pieces of music recorded on the disk, the total reproduction time (hours and minutes) of the pieces of music, and the address and reproduction time of each of the pieces of music. That is, the TOC includes a considerably large number of data. Therefore, a memory considerably large in capacity is necessary to store all of the data, with the result that the disk player is unavoidably high in manufacturing cost. Since all TOC data are read in the conventional method, it takes a relatively long period of time for reading the data, as a result of which reproduction cannot be started quickly.

Yet Further, the invention relates to a miss-tracking control method for a disk player in which, when a tracking miss, or so-called "stylus jump", is caused, for instance, by external vibration, an allowable address range is changed according to the frequency of the tracking miss.

In a disk player for optical disks such as compact disks, when sub-codes recorded on a disk are continuously being read so that, while a present address is being stored, an address to be reproduced (expected address) is read successively, it is determined whether reproduction is normal. If a tracking miss is caused, for instance, by external vibration, then the difference between the present address and the expected address is increased. Therefore, in such a case, control is so made that the pickup of the disk player is returned to the expected address. For instance, the disk player may be so designed that, when the difference between the expected address and the present address is one second or more, it is determined that tracking miss has occurred, and the returning operation is carried out.

However, this method is not advantageous for a disk player mounted on a vehicle. That is, when the vibration level of the vehicle is high, tracking miss will occur frequently. Therefore, if a returning operation is carried out whenever the difference between the expected address and the present address is about one second, then little reproduction can be carried out. Furthermore, for the returning operation, the audio signal is muted, and therefore the silent period is increased.

SUMMARY OF THE INVENTION

Accordingly, an object of the invention is to eliminate the above-described difficulties accompanying a conventional method of playing a disk.

In accordance with the above object, the invention provides a lead-in reading method for a disk player in which, in reading the TOC in the lead-in region of a disk at the start of the playing of the disk, only the necessary data are read so that the necessary memory can be small in capacity, and in which if the necessary data cannot be obtained by the first reading operation, the pickup is caused to jump across tracks to quickly obtain the necessary data.

Accordingly, a further object of the invention is to eliminate the above-described drawback accompanying a conventional random music reproduction method.

In accordance with this object, the invention provides a random music selection method for a disk player in which, for random music reproduction, the same piece of music cannot be reproduced in a protective range determined according to the number of pieces of music to be reproduced, whereby even when the total number of pieces of music to be reproduced is small, better random music reproduction is carried out.

A still further object of the invention is to eliminate the above-described difficulties in the conventional music selection method.

In accordance with this object, the invention provides a music selection method for a disk player in which, with only a few data read from the TOC recorded in the lead-in region of a disk, a search is made for a piece of music selected, whereby a memory small in capacity can be utilized, and reproduction can be started quickly.

A yet further object of the invention is to eliminate the above-described difficulties related to tracking miss.

In accordance with this object of the invention, a tracking miss control system is provided for a disk player in which the returning operation allowable range is increased with the frequency of the tracking miss so that small tracking misses are not detected.

DESCRIPTION OF THE PREFERRED EMBODIMENTS

A preferred embodiment of the invention applied to disk player in which a disk is extracted from a magazine holding a number of disks and is then played will be described with reference to FIG. 1.

Figure 1:
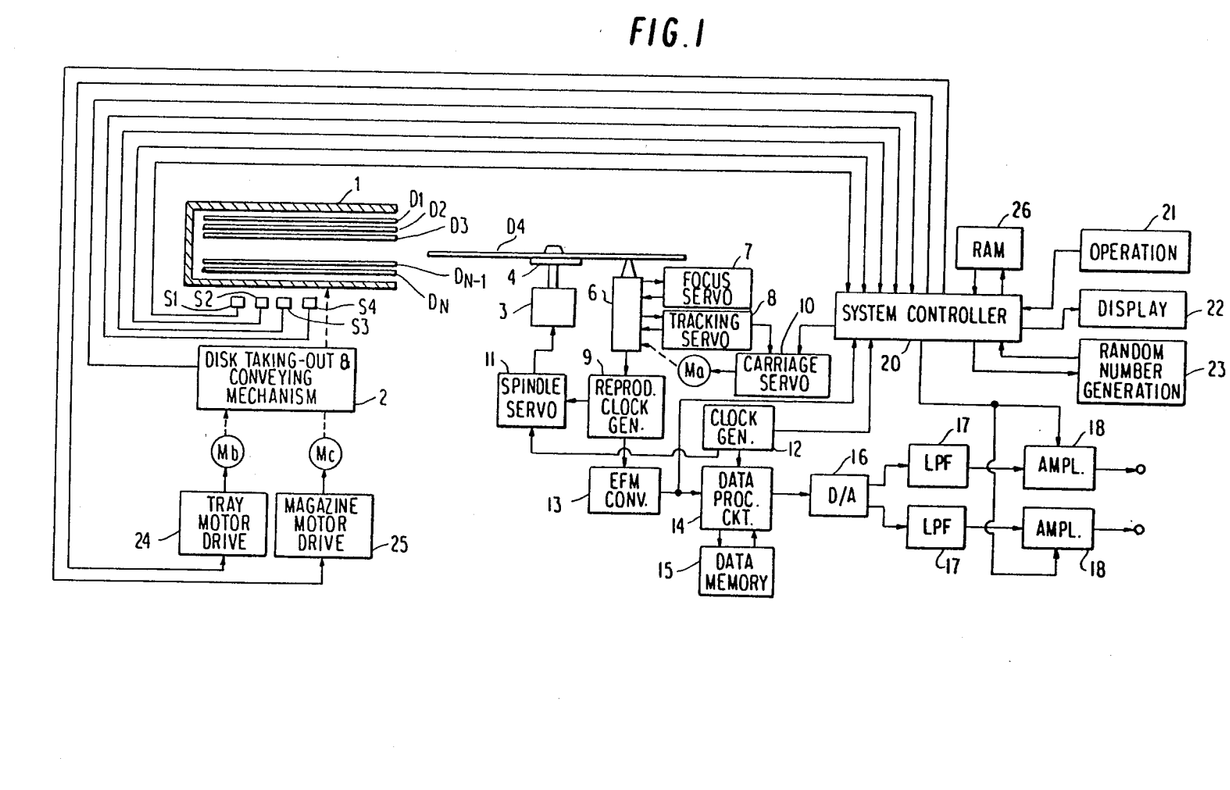
FIG. 1 is a block diagram showing an example of a disk player to which the lead-in reading method of the invention can be applied.

In FIG. 1, reference numeral 1 designates a magazine in which N disks (N being a natural number larger than one) are arranged in order. The magazine 1 has N trays to hold the N disks. The trays can freely move in and out of the magazine 1. The magazine is detachably mounted on the disk player at a predetermined position. One of the N disks $D_1$ through $D_N$ laid on the N trays located at a plurality of respective disk accommodating positions is conveyed by a disk extracting and conveying mechanism 2 to the disk bearing surface of a turntable 4 secured to the rotary shaft of a spindle motor 3, and is then clamped. The disk extracting and conveying mechanism 2 includes an ejecting member for ejecting a tray from the magazine and moving the disk to the disk bearing surface of the turntable 4, a clamping mechanism for clamping a disk placed on the disk bearing surface of the turntable 4 by the ejecting member, a moving plate for changing the position of the ejecting member relative to the magazine 1 in the direction of arrangement of the trays, and sensors for detecting the position of the moving plate and the operation of the clamping mechanism.

In the disk extracting and conveying mechanism, the moving plate is moved to change the position of the ejecting member so that a desired disk can be extracted. The arrangement and construction of the magazine and the disk extracting and conveying mechanism have been described in detail, for instance, in Japanese Patent application No. 153651/1985 and U.S. Pat. application ser. No. 884,949.

Data recorded on a disk $D_n$ extracted from the magazine 1 and clamped on the disk bearing surface of the turntable 4 by the disk extracting and conveying mechanism 2 are read by means of an optical pickup 6. The optical pickup 6 includes a laser diode, objective lens, focus actuator, tracking actuator, and photodetector The output of the pickup 6 is applied to a focus servo circuit 7, a tracking servo circuit 8, and a reproduction clock generating circuit 9, the latter including an RF amplifier.

In the focus servo circuit 7, a focus error signal is produced, for instance, using the well-known astigmatism method. The focus actuator of the pickup 6 is driven by the error signal thus produced. As a result, the output laser beam of the laser diode is focused on the recording surface of the disk $D_n$ through the objective lens, thus forming a data detecting light spot. In the tracking servo circuit 8, a tracking error signal is generated, for instance, using the well-known push-pull method. The tracking error signal is applied to the tracking actuator of the pickup 6 and to a carriage servo circuit 10. The output of the carriage servo circuit 10 is supplied to an electric motor Ma which drives a carriage (not shown) supporting the pickup 6 so that the pickup 6 is moved radially of the disk $D_n$.

The reproduction clock generating circuit 9 produces a demodulating reproduction clock signal, which is applied to a spindle servo circuit 11. In the spindle servo circuit 11, a drive signal is generated according to the phase difference between the reproduction clock signal and a reference clock signal outputted by a clock generating circuit 12. The drive signal thus produced drives the spindle motor 3 in such a manner that the tracking linear velocity of the disk $D_n$ is constant. The output of the RF amplifier in the reproduction clock generating circuit 9 together with the reproduction clock signal is applied to an EFM demodulating circuit 13 including a frame synchronizing circuit. The demodulation output of the EFM demodulating circuit 13 is processed by a data processing circuit 14, which subjects a demodulation data signal to deinterleaving, error detection, correction or complementing The demodulation output thus processed is stored in a data memory 15 and then read out with the aid of the clock signal outputted by the clock generating circuit 12. The demodulation output thus read out is applied to a D/A (digital-to-analog) converter 16, where it is converted into an analog signal. The analog signal is applied through LPFs (low-pass filters) 17 to amplifiers 18, which output right and left audio signals. Each of the amplifiers 18 is designed so that its frequency characteristic can be varied by control data.

A control signal in the output data of the EFM demodulating circuit 13 is supplied to a system controller 20 so that various data representing, for instance, music portion, inter-music portions, performance time and disk type number are stored therein. The system controller 20 is implemented with one or more microcomputers including a processor, ROM read-only memory), RAM (random access memory), interface circuit, and timer. In the system controller 20, the processor operates according to program according to a flowchart of FIG. 2 and stored in the ROM to process detection signals outputted by the disk extracting and conveying mechanism 2, key input data provided by an operating section 21, and the output data of a random number generating circuit 23, thereby to supply various instructions and data to the carriage servo circuit 10, the spindle servo circuit 11, the amplifiers 18, a display unit 22, and drive circuits 24 and 25. The random number generating circuit 23 is designed so that, for instance, the output of a base-m counter (m being a natural number) in which the coefficient value changes gradually with a very short period is latched in response to a data output instruction and then outputted. The drive circuits 24 and 25 are designed so that they supply drive current to electric motors Mb and Mc according to instructions so as to drive the moving plate and the ejecting member in the disk extracting and conveying mechanism 2, respectively.

In FIG. 1, reference numeral 26 designates a RAM for storing the output data of the system controller 20.

Further in FIG. 1, S1 through S4 designate detecting switches arranged near the magazine 1 mounted on the disk player. More specifically, S1 designates a magazine detecting switch which provides an output when the magazine 1 is mounted in the magazine mount of the disk player; S2, a disk detecting switch for detecting the presence or absence of a disk on the tray ejected from the magazine; S3, a tray detecting switch for detecting whether or not a tray has been put back into the magazine 1; and S4, a magazine position detecting switch for detecting the position of the magazine moving vertically relative to the turntable 4.

Figure 2:
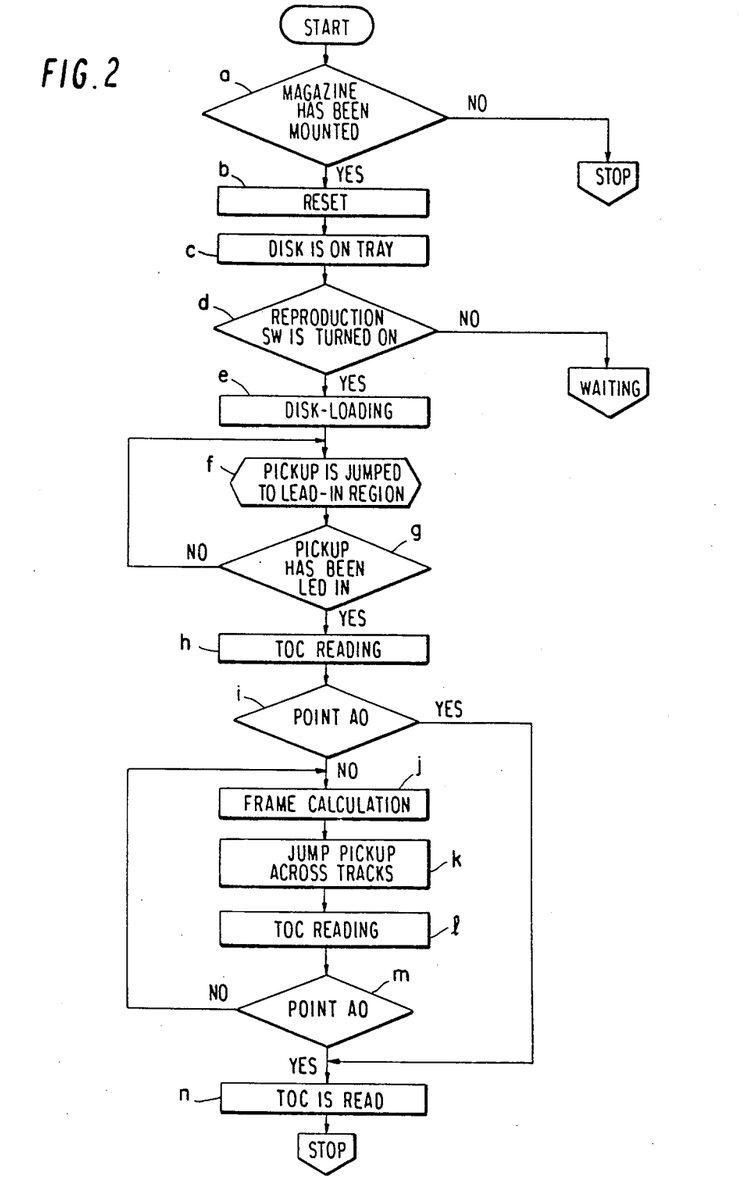
FIG. 2 is a flowchart for a description of a disk playing method according to a first embodiment of the invention.

The operation of the processor in the system controller 20 will be described with reference to the flowchart of FIG. 2.

When the power switch is turned on, the processor determines whether or not the magazine 1 has been mounted on the magazine mount (Step a). When the magazine detecting switch S1 detects the mounting of the magazine 1 and applies the detection signal to the processor 1, the latter determines that the magazine 1 has been mounted as required, and the next step is effected. If the magazine is not mounted, the operation is suspended.

In the next step, the magazine 1 is moved vertically to a position where the uppermost or lowermost tray can be pulled out (Step b). When the magazine position detecting switch S4 applies the magazine position signal to the processor, the next step c is executed.

In Step c, it is detected whether or not a disk is on the tray to be ejected from the magazine. When the disk detecting switch S2 detects the presence of a disk, the next Step d is executed. In Step d, the processor determines whether or not the reproduction switch has been turned on. If the reproduction switch is not turned on yet, the processor maintains the present operation until the reproduction switch is turned on. When the reproduction switch is turned on, the processor applies a disk loading signal to the player. In response to the disk loading signal, in the player, the disk is loaded on the turntable (Step e), and the disk is rotated and the pickup is jumped to the lead-in region of the disk (Step f).

In this operation, the reprocessor determines whether or not the pickup has been led in (Step g). If the pickup is not led in, then the preceding Step f is executed again. When it is determined that the pickup has been led in, the following Step h is carried out.

In Step h, TOC reading is carried out. It is determined whether or not the result of the TOC reading by the processor is a point AO (Step i). The point AO is data representing the total number of pieces of music in the TOC including the number of pieces of data. That is, it is detected whether or not that data have been read. When the point AO has been read, necessary data of the TOC are read (Step n).

When, on the other hand, the point AO has not been read, the processor utilizes the read data to perform a frame calculation to determine the approximate position of the point AO of the next TOC (step j), then jumps the pickup across the tracks (Step k) and reads the TOC at the new position of the pickup (Step 1). It is then determined whether or not the data of the TOC thus read is the point AO (Step m). When the point AO has been read, the next Step n is executed. When the point AO has not been read, the operation is returned to the above-described Step j of frame calculation. Upon reading only the necessary data through the above-described operations, the processor suspends its operation.

As described above, in the invention, if the necessary data cannot be obtained in reading the TOC of the lead-in region at the start of the playback of the disk, then the frame calculation is carried out so that the pickup is caused to jump across tracks to read the next TOC. Therefore, the time required for storing the necessary data is reduced, and accordingly the playback of the disk can be started quickly.

Figure 3:
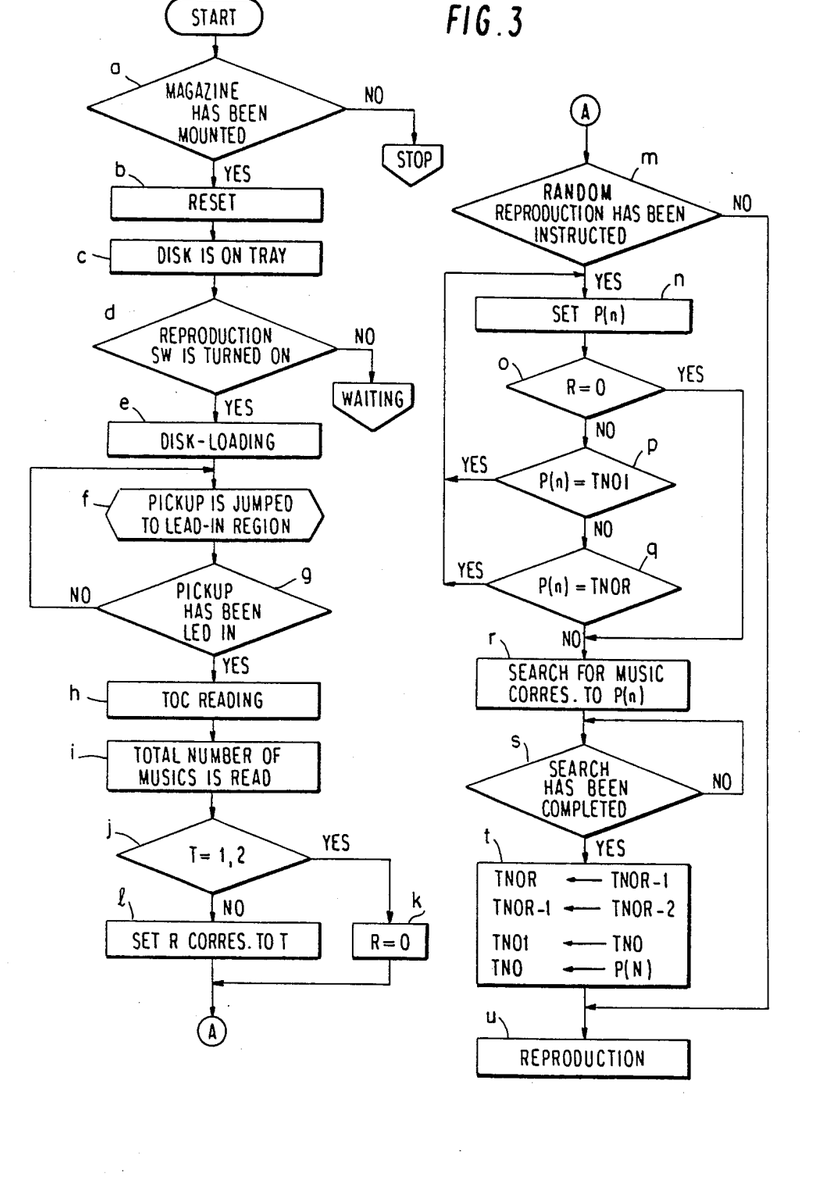
FIGS. 3 through 5 are flowcharts illustrating disk playing methods of respective second through fourth embodiments of the invention.

A second embodiment of the method of the invention will now be described with reference to the flowchart of FIG. 3. The steps up to Step g are the same as discussed above.

In Step h, the TOC is read. In reading the TOC, the processor stores at least the total number of pieces of music T in memory (Step i). The processor reads the stored content; that is, it determines whether or not the total number of pieces of music is one or two (Step j). If the total number of pieces of music is one or two (not more than two), then random music selection is unnecessary. Therefore, in this case, the protective range is not employed, and the random constant is set to zero (0). Thereafter, the next Step k is executed.

If, in Step j, it is determined that the total number of pieces of music is three or more, then a random constant R corresponding to the number of pieces of music detected is determined (Step 1). That is, in this embodiment, the protective range is eight pieces of music at the maximum, and therefore the random constant R is as follows:

$$R \leq T/2$$

where T is the total number of pieces of music. For instance, when $T \geq 16$, $R = 8$. In this case, the same piece of music is prevented from being mixed in the random reproduction of eight pieces of music.

After the random constant has been determined in this manner, the processor detects whether or not random reproduction has been instructed by the operator (Step m). When random reproduction is not instructed, Step u is executed; that is, the pieces of music are reproduced in the normal manner beginning with the first piece of music. Upon the detection of a random reproduction instruction, the random constant R determined in the previous Step 1 is produced, and a random number generation value P(n) is set (Step n). Thereafter, the processor determines whether or not the protective range of Step k is to be used; i.e., whether or not $R = 0$ (Step o). When it determined that no protective range is employed, Step r is carried out so that the P(n)-th piece of music is detected.

In the case where in Step o it is determined that it is necessary to use the protective range, i.e., $R \neq 0$ is detected, the processor determines whether or not the random number generation value P(n) corresponds to the piece of music which has been reproduced (Step p). When it is determined that the random number generation value P(n) corresponds to one of the R pieces of music in the previous reproduction, Step n is effected so that random number generation is carried out again, and if not, the following Step is executed. In this Step, it is determined whether or not the random number generation value P(n) corresponds to the second of the R pieces of music reproduced. If the value P(n) corresponds to the second piece of music, then similar to the case of Step p, Step n is executed again, and if not, it is determined that the value P(n) corresponds to the third piece of music. The above-described operation is carried out R times (Step q).

When, as a result of the above-described operation, it is determined that the random number generation value P(n) corresponds to none of the R pieces of music reproduced, the processor performs a searching operation for a piece of music corresponding to the value P(n) (Step r), and detects whether or not the searching operation has been accomplished (Step s). When it is detected that the searching operation has been accomplished, the data in the memory is renewed (Step t). Upon completion of the data reviewing operation, the piece of music corresponding to the random number generation value P(n) is reproduced (Step u).

As described above, when random reproduction is not specified, the processor operates so that the piece of music corresponding to the random number generation value P(n) being played is not in the predetermined protective range.

As described above, in the second embodiment of the invention, at least the total number of pieces of music is read from the TOC, and in the case where random music selection is carried out, control is carried out so that the same piece of music is not reproduced in the protective range determined according to the number of pieces of music. Furthermore, in the method of the invention, the protective range can be changed according to the number of pieces of music to be reproduced. Therefore, even in the case where the number of pieces of music is small, they can be played continuously at random.

Figure 4:
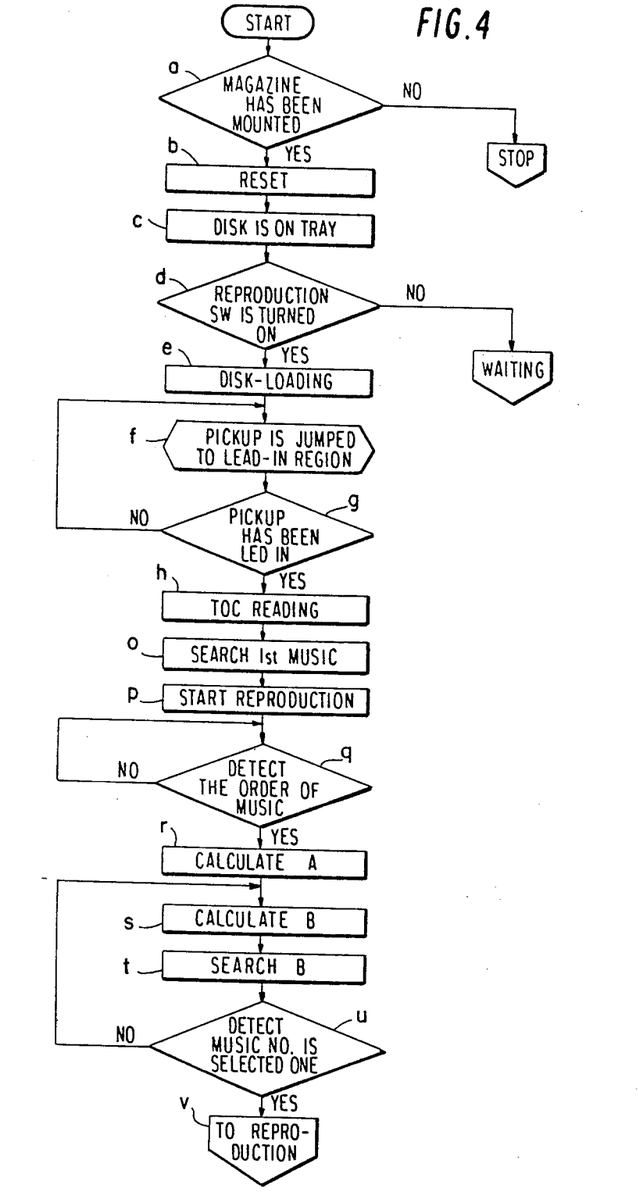

A third embodiment of the invention will be described with reference to the flowchart of FIG. 4. In this embodiment, Step a through n are the same as described with reference to FIG. 2, and hence a further description of those steps will be omitted.

After only the necessary data have been read as described above, a search for the first piece of music is made (Step o). After the search has been accomplished, reproduction is started (Step p). During reproduction, the processor detects whether or not music selection has been carried out, and detects the order of a piece of music (hereinafter referred to as "a music number") selected (Step q). When a music number is selected, then the music number is stored, and the following Step r is executed. In Step r, the processor carries out the following calculation:

A = (stored total reproduction time)/(total number of pieces of music)

Then, the processor carries out the following calculation (Step s):

B = A × (selected music number - music number being reproduced now)

The processor then starts a search based on the result of the above calculation of B (Step t).

In the search, it is determined whether or not each detected music number is the selected one (Step u). Upon detection of the selected music number, the processor starts reproduction at that position.

In the above-described case, music selection is carried out during the reproduction. It goes without saying that, in the case where music selection is performed before the start of reproduction, instead of reproduction of the first piece of music, the search for the selected music number is carried out.

As was described above, in the music selection method of the third embodiment of the invention, only the total reproduction time and the total number of pieces of music are read from the TOC, and when music selection is made, an average time per piece of music is calculated from the total reproduction time and the total number of piece of music, and a search is made for the selected music number according to the average time thus calculated. Therefore, the disk player can use a memory of small capacity, and can accordingly be manufactured at low cost. Furthermore, in the system of the invention, the pickup is moved substantially to the position of the selected piece of music without reading the addresses provided for the pieces of music recorded on the disk. Therefore, reproduction can be quickly started.

Figure 5:
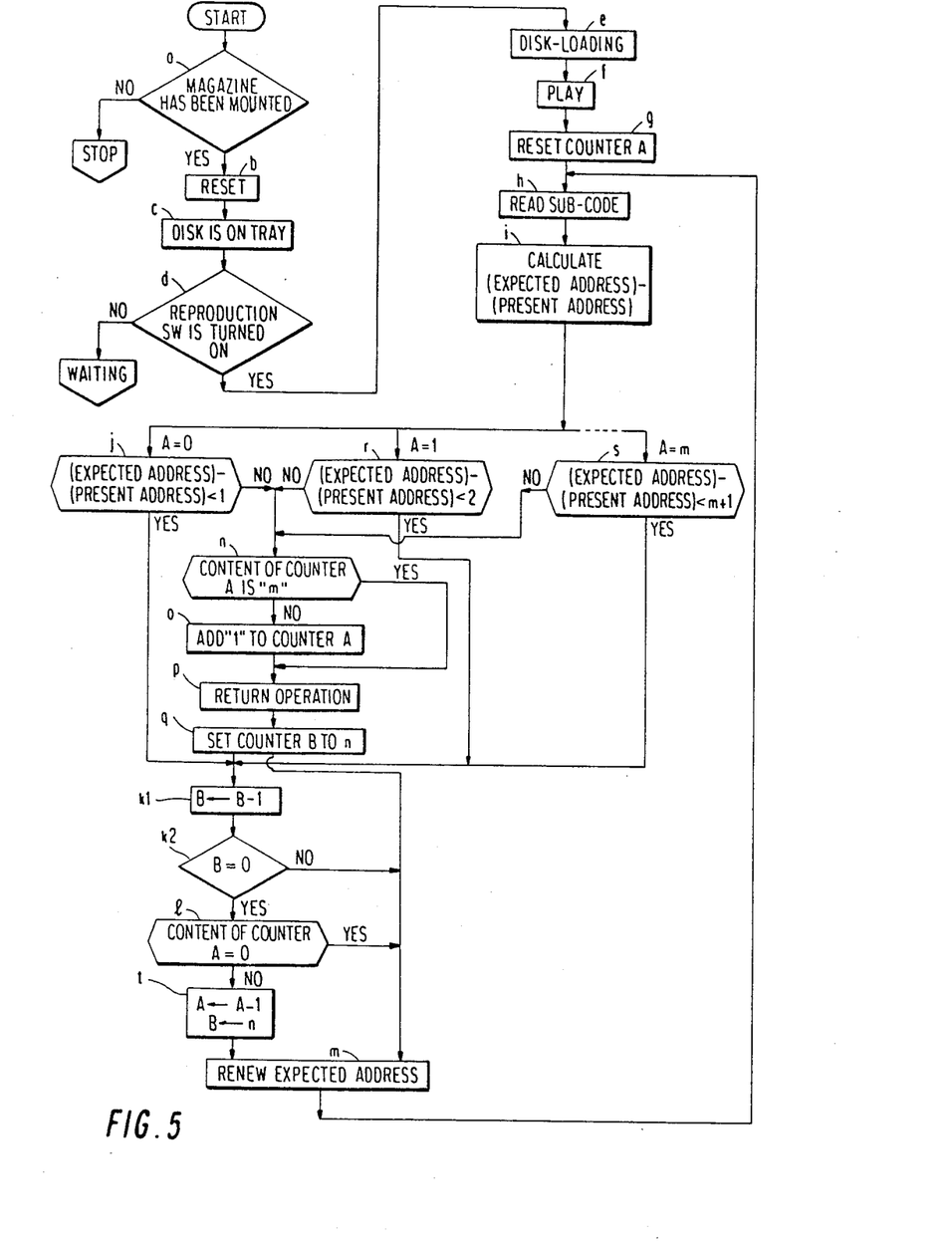

A fourth embodiment of the invention will now be described with reference to the flowchart of FIG. 5. In this embodiment, Steps a to e are the same as in FIG. 2. Playing is started in Step f.

Next, the processor resets a counter A for determining the protective range (Step g) and reads a sub-code (Step h). In this connection, the processor detects the difference between the address actually read (present address) and the address of the sub-code read immediately before it (expected address) (Step i) When, as a result of the reading operation, it is determined that no tracking miss has occurred, i.e., expected address)−(present address)<1 second, Step j is executed. In Step k, it is detected whether or not a tracking miss has occurred for a predetermined period of time. When no tracking miss has occurred, it is detected whether or not the content of the counter A is zero (0) (Step 1). If the content of the counter A is zero (0), the expected address is renewed (Step m), and then the operation is returned to Step h for normal reproduction in which the sub-code reading operation is carried out.

If, in the sub-code reading operation (Step h), tracking miss occurs, for instance, due to external vibration for a period of time in a range of from one second to two seconds, then Step j supplied an output to Step n.

In Step n, it is determined whether or not the content of the counter A is a maximum value m. In this case, the content of the counter A is not the maximum value m, and therefore the processor adds one (+1) to the content of the counter A (Step o), permits a returning operation (Step p), and sets the value of a counter B to n (Step q). Thereafter, Step m is executed in which the expected address is renewed. Step h is then effected again.

In the case where tracking miss occurs in the sub-code reading operation (in Step h), Step r is executed, and the same operations as described above are carried out. However, it should be noted that, in Step o, the content of the counter A is set to two (2) by the addition of +1. Similarly, the detection is continuously carried out until (expected address)−(present address)<(m+1) occurs (Step s), so that the tracking miss is detected and the protective range is successively increased.

When the external vibration level decreases, Step s supplies an output to Step k. As a result, the value of the counter B is decreased by one (1), i.e., it is set to (n−1). Then, in Step 1, it is detected whether or not the content of the counter A is zero (0). Thereafter, the expected address is renewed, and then Step h is executed for the sub-code reading operation. If the vibration level further decrease, similarly Step s applies the output to Step k. The above-described operations are carried out repeatedly until the value of the counter A is returned to zero (0). In Step t, the operations are carried out until the value of the counter A is returned to $-1$ and the value of the count B to n.

If the vibration level continuously decreases, Step r supplies an output to Step k. As a result, in Step k, the count value of the counter B is decreased.

The above-described operations are repeatedly carried out. When the content of the counter A is returned to zero (0) while the protective range is gradually decreased in the above-described manner, the processor causes the disk player to perform the normal reproduction again.

As is apparent from the above description, in the tracking miss control system of the fourth embodiment of invention, the allowable address range for the returning operation is changed according to the frequency of the tracking miss caused, for instance, by external vibration. When, for instance, the frequency tracking miss is high, small tracking misses are not detected. This alleviates the various problems attributed to the returning operation being carried out whenever tracking miss occurs.

What is claimed is:

1. A disk playing method for a disk player, comprising the steps of: reading during the playback of a disk loaded in said disk player a total reproduction time and a total number of pieces of music from an accumulated total time code recorded in a lead-in region of said disk; detecting a selected order of a piece of music calculating an average reproduction time per piece of music from said total reproduction time and said total number of pieces of music; and searching for said selected piece of music according to said average reproduction time thus calculated.

* * * * *